United States Patent [19]
Broughton et al.

[11] Patent Number: 5,124,105
[45] Date of Patent: Jun. 23, 1992

[54] METHOD OF MANUFACTURING A WAX PATTERN OF A BLADED ROTOR

[75] Inventors: James Broughton, Warwick; Graham J. Marklew, Coventry; Mark H. Griffiths; Hubert D. Sellars, both of Bristol, all of England

[73] Assignees: Rolls-Royce plc, London; Rolls-Royce Business Ventures Limited, Derby, both of England

[21] Appl. No.: 647,255

[22] Filed: Jan. 29, 1991

[30] Foreign Application Priority Data

Mar. 17, 1990 [GB] United Kingdom ............... 9006071

[51] Int. Cl.⁵ .......................................... B29C 33/40
[52] U.S. Cl. ............................ 264/219; 264/225; 264/227; 264/300; 264/313; 264/DIG. 44
[58] Field of Search ............. 264/219, 220, 225–227, 264/300, 313, 334, DIG. 44; 164/11, 14, 45

[56] References Cited

U.S. PATENT DOCUMENTS

| | | | |
|---|---|---|---|
| 3,678,987 | 7/1972 | Kydd | 264/226 X |
| 4,062,396 | 12/1977 | Day | 164/45 X |
| 4,489,469 | 12/1984 | Hall | 264/219 X |
| 4,556,528 | 12/1985 | Gersch et al. | 264/DIG. 44 |
| 4,682,643 | 7/1987 | Bernhardt et al. | 164/45 X |

FOREIGN PATENT DOCUMENTS

| | | | |
|---|---|---|---|
| 1-317719 | 12/1989 | Japan | 264/227 |
| 1482437 | 8/1977 | United Kingdom | |
| 1539075 | 1/1979 | United Kingdom | |

*Primary Examiner*—Richard L. Chiesa
*Attorney, Agent, or Firm*—Oliff & Berridge

[57] ABSTRACT

In the manufacture of a wax pattern for use in the lost wax casting of a bladed rotor of the radial flow type, the bladed region of a master pattern is enclosed by a curable epoxy resin/aluminium powder composition. Sufficient of the cured resin composition is then machined away so that a plurality of resin composition segments are defined, one segment being interposed between adjacent blades on the master pattern. The segments are then removed from the master pattern and placed in an appropriately configured die member so as to define a complete die for the production of a wax pattern in the form of the master pattern.

7 Claims, 2 Drawing Sheets

METHOD OF MANUFACTURING A WAX PATTERN OF A BLADED ROTOR

BACKGROUND OF THE INVENTION

1. Field of the Invention

This invention relates to the manufacture of a wax pattern of a bladed rotor and in particular a radial flow bladed rotor suitable for a fluid flow machine such as a gas turbine engine.

2. Description of the Related Art

Bladed rotors of the radial flow type, that is centrifugal flow compressors and radial flow turbines, typically consist of a central body rotatable about a given axis which has a number of aerofoil blades integral therewith. In the case of the centrifugal flow compressor, the blades define passages which converge in the direction of fluid flow as the flow direction changes from axial flow to radial flow. Similarly with the radial flow turbine, the blades define passages which diverge in the direction of fluid flow as the flow direction changes from radial flow to axial flow.

Since such bladed rotors are typically of integral construction it is common to manufacture them by casting using the well known "lost-wax" casting technique. In that technique, a wax pattern in the shape of the bladed rotor to be manufactured is covered with a heat resistant and hardenable material. The wax pattern is then removed by melting to leave a mould for use in the final casting operation.

The original wax patterns are frequency manufactured by injection moulding using a metal die of appropriate configuration. Such dies are expensive to manufacture and thereby make a significant contribution to the total cost of bladed rotor manufacture.

SUMMARY OF THE INVENTION

It is an object of the present invention to provide a method of manufacturing a wax pattern of a bladed rotor of the radial flow type which is cheaper than has heretofore been the case.

According to the present invention, a method of manufacturing a wax pattern for a bladed rotor of the radial flow type comprises the subsequent steps of placing a release material on the bladed region of a master pattern of the bladed rotor, enclosing said bladed region with a hardenable resin based composition, causing said resin to harden, machining away sufficient of said hardened resin composition to define a plurality of resin composite segments, one segment being interposed between adjacent blades on said master pattern, removing said resin composition segments from said master pattern, placing said resin segments in an appropriately configured die member so that said segments and die member cooperate to define a complete die for the production of a wax copy of said master pattern, means being provided to maintain said resin composition segments in the same disposition relative to each other in said die member as that which existed on said master pattern, and injecting wax into said complete die to produce a wax pattern of said master pattern.

BRIEF DESCRIPTION OF THE DRAWINGS

The invention will now described, by way of example, with reference to the accompanying drawings in which.

DETAILED DESCRIPTION OF THE PREFERRED EMBODIMENTS

Figure 1:
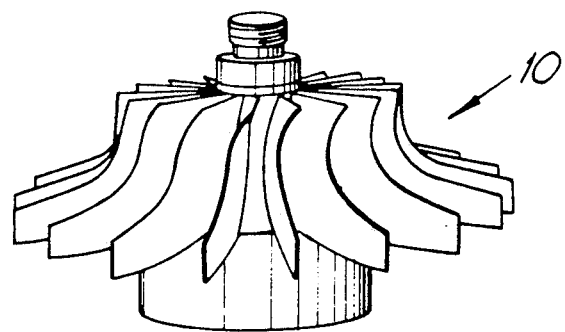
FIG. 1 is a general view of a bladed rotor of the radial flow type produced using a wax pattern produced in accordance with the present invention.

The present invention is concerned with the manufacture of wax patterns which are intended for use in the casting of radial flow bladed rotors of the type shown in FIG. 1 by the well known lost wax method. The bladed rotor shown at 10 in FIG. 1 is a radial in flow turbine rotor but it will be appreciated that the present invention is also applicable to the manufacture of centrifugal flow compressor rotors which are of the same general configuration.

Figure 2:
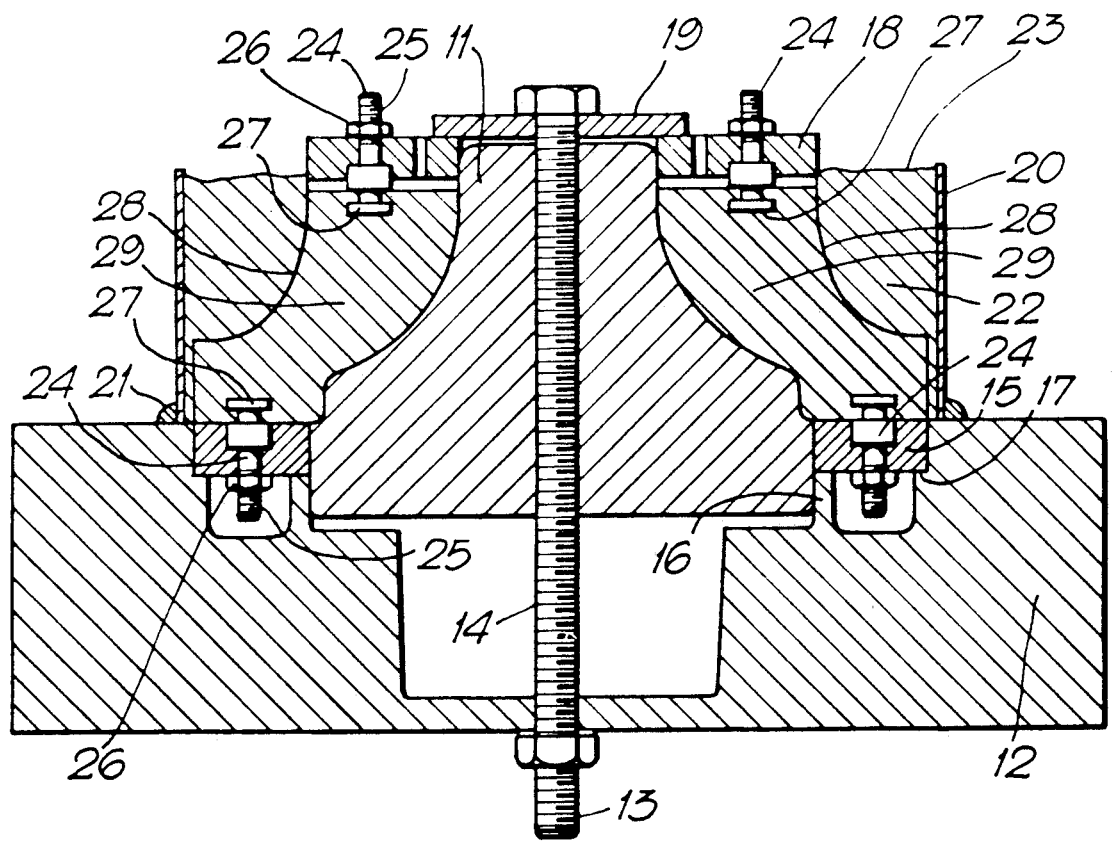
FIG. 2 is a sectioned side view of apparatus for producing resin die segments for use in the method of the present invention.

The first stage of manufacture of the wax pattern is the manufacture of a master pattern from an easily machinable metal such as aluminium. The master pattern is made so that it conforms exactly with the configuration of the eventual bladed rotor 10. The master pattern, which is shown at 11 in FIG. 2, is bolted in position on a support member 12 by means of an elongate bolt 13 which is coaxial with the longitudinal axis 14 of the master pattern 11.

The radially outermost region of the master pattern 11 rests on a first ring 15 which itself rests upon an annular flange 16 and annular shoulder 17 machined into the support member 12. A second ring 18 of smaller diameter than the first ring 15 locates in position on the opposite end of the master pattern 11 so as to be on top of the master pattern 11 when viewed in FIG. 2. A clamping disc 19 retains the second ring 18 in position on the master pattern 11.

A plastic tube 20 is placed around the master pattern 11 so that it rests, end on, on top of the support member 12. A suitable sealant 21 is then applied around the join between the tube 20 and support member 12.

After the application of a suitable release material to the master pattern 11 a slip coat consisting of an epoxy resin containing an aluminium powder filler in the proportion 1:1 is then applied to the exposed surface of the master pattern 11. This is then followed by the application of the main mixture 22 consisting of an epoxy resin and an aluminium powder filler in the proportion 1:2. The main mixture 22 is poured into the volume defined by the tube 20 until it reaches the level 23.

In order to ensure that the main mixture 22, when cured, is linked to the first and second rings 15 and 18, a series of similar pegs 24 are attached to each of the rings 15 and 18. Each peg 24 has a screw threaded end portion 25 which, in cooperation with a nut 26 facilitates its retention on its associated ring 15 or 18. The opposite end of each peg 24 to the screw threaded portion 25 is provided with an enlarged diameter end portion 27 which provides an interlock between the cured main mixture 22 and the first and second rings.

When the main mixture 22 has cured, the master pattern retention bolt 13 is removed to permit the master pattern 11, the first and second rings and the main mixture 22 to be parted from the support member. The plastic tube 20 is then removed and part of the cured main mixture 22 is machined away. Specifically that portion of the main mixture 22 which extends down as far as the radially outer edges of 28 of the blades on the master pattern 11 is machined away. This leaves a plurality of segments 29, filling the spaces between adjacent blades. In order that each of the segments 29 is maintained in position on the master pattern 11, sufficient of the pegs 24 are provided to ensure that each segment 29 is supported by two pegs; one attached to the first ring 15 and the other attached to the second ring 18.

The positions of each of the segments 29 relative to the first and second rings 15 and 18 is noted whereupon the nuts 26 are removed from the pegs 24 and the rings 15 and 18 removed. This then permits the removal of each of the segments 29 from the interblade spaces on the master pattern 11.

Figure 3:
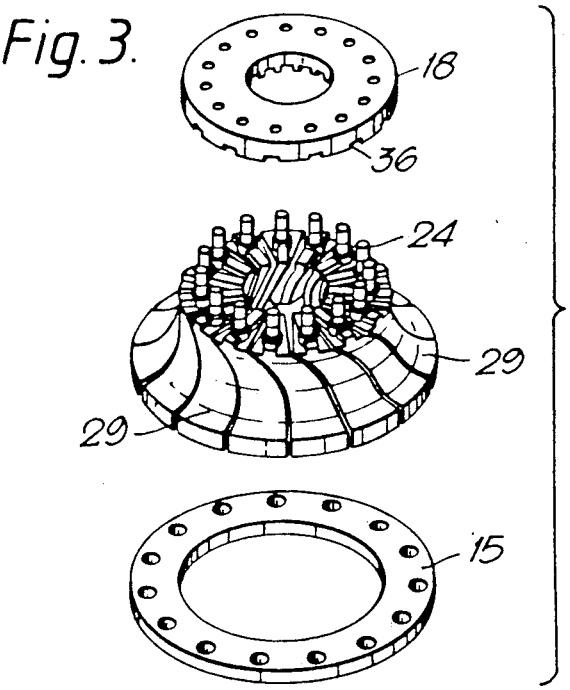
FIG. 3 is an exploded view of an assembly of resin die segments produced using the apparatus of FIG. 2 together with support rings for those segments.
Figure 4:
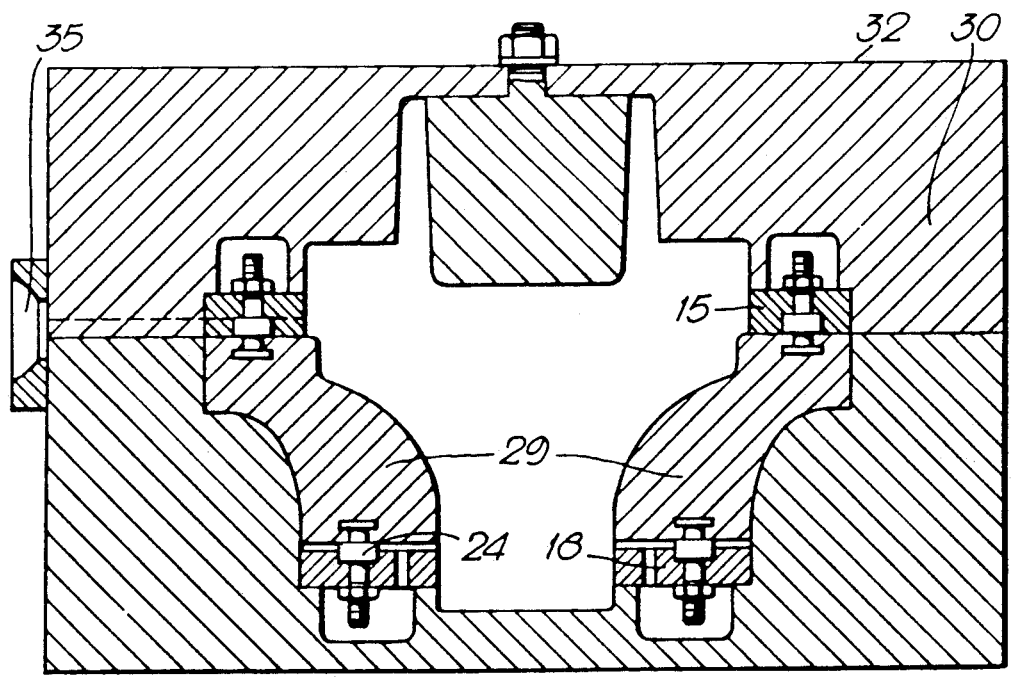
FIG. 4 is a sectioned side view of a complete die for use in the injection moulding of a wax pattern in accordance with the method of the present invention.

The segments 29 are re-assembled on the first and second rings 15 and 18 in the manner indicated in FIG. 3 so that each segment 29 is returned to its original position on the rings 15 and 18. It will also be seen from FIG. 3 that the second ring 18 is provided with a number of radially extending grooves 36 on the face thereof which confronts the segments 29, thereby providing further assistance in ensuring that the relative positions of the segments 29 and the first and second rings 15 and 18 are preserved.

The segment 29/rings 15 and 18 assembly is then located between the two halves of a die member 32. Appropriate annular flanges 33 and shoulder 34 within the die member 32 provide location features for the first and second rings 15 and 18.

The internal configuration of the die member 32 is such that in cooperation with the segments 29 it defines the shape of the master pattern 11. Consequently the die member 32 in cooperation with the segments 29, define a complete die for the production of wax patterns which are identical in shape to the master pattern 11. An injection port 35 in the die member 32 facilitates the injection of hot wax into the die member 32 interior to produce the wax pattern.

When the wax has cooled and solidified after injection, the die member 32, the segments 29 and the rings 15 and 18 are dis-assembled to permit the removal of the wax pattern. The wax pattern is then used in the normal way using the lost wax process to produce a mould for the production of a metallic bladed rotor.

It will be seen therefore that the method of the present invention provides a way of producing wax patterns for bladed rotors of the radial flow type which does not include the use of a complex, and therefore expensive, die.

We claim:

1. A method of manufacturing a wax pattern for a bladed radial flow rotor comprising the subsequent steps of placing a release material on a bladed region of a master pattern of the bladed rotor, enclosing said bladed region with a hardenable resin based composition, causing said resin to harden, machining away a sufficient amount of said hardened resin composition to define a plurality of resin composition segments, one segment being interposed between adjacent blades on said master pattern, removing said resin composition segments from said master pattern, placing said resin composition segments in a die member configured so that said segments and die member cooperate to define a complete die for the production of a wax copy of said master pattern providing maintaining means comprising two ring members for maintaining said resin composition segments in the same disposition relative to each other in said die member as that which existed on said master pattern, providing means to provide a mechanical connection between each of said segments and said ring members so that said segments maintain said ring members in coaxial, axially spaced apart relationship, and injecting wax into said complete die to produce a wax pattern of said master pattern.

2. A method of producing a wax pattern as claimed in claim 1 wherein said means providing a mechanical interconnection between each of said segments and said ring members comprises two pegs embedded in each segments, each peg being detachably attached to one of said ring members.

3. A method of producing a wax pattern as claimed in claim 1 wherein said resin based composition comprises an epoxy resin with an aluminium powder filler material.

4. A method of producing a wax pattern as claimed in claim 3 wherein said resin based composition comprises an epoxy resin with an aluminium powder filler material in the ratio of 1:2.

5. A method of producing a wax pattern as claimed in claim 1 wherein a resin based slip coat is applied to said master pattern after the application thereto of said release material but before enclosing said master pattern with said resin based composition.

6. A method of producing a wax pattern as claimed in claim 5 wherein said resin based slip coat comprises an epoxy resin with a resin filler powder.

7. A method of producing a wax pattern as claimed in claim 6 wherein said resin based slip coat comprises an epoxy resin with an aluminium powder filler material in the ratio of 1:1.

* * * * *